United States Patent [19]

Sackmann et al.

[11] Patent Number: 4,931,510
[45] Date of Patent: Jun. 5, 1990

[54] POLYMERS FROM ETHYLENIC MONOMERS

[75] Inventors: Günter Sackmann, Leverkusen; Joachim König, Odenthal; Heinz Bäumgen, Leverkusen, all of Fed. Rep. of Germany

[73] Assignee: Bayer Aktiengesellschaft, Leverkusen, Fed. Rep. of Germany

[21] Appl. No.: 312,089

[22] Filed: Feb. 17, 1989

[30] Foreign Application Priority Data

Mar. 4, 1988 [DE] Fed. Rep. of Germany ....... 3807097

[51] Int. Cl.$^5$ ..................... C08F 267/10; C08F 20/10
[52] U.S. Cl. .................................. 525/302; 525/242; 525/303; 525/309; 526/201; 526/203
[58] Field of Search ............... 525/205, 212, 242, 302, 525/303, 309; 524/458, 460

[56] References Cited

U.S. PATENT DOCUMENTS 4,036,803 7/1977 Kobashi ............................ 525/212

Primary Examiner—Christopher Henderson
Attorney, Agent, or Firm—Sprung, Horn, Kramer & Woods

[57] ABSTRACT

Polymers obtainable by subjecting at least one monomer, polymerizable by free radicals, to a free-radical emulsion polymerization in the presence of a polymer of the formulae I and/or II

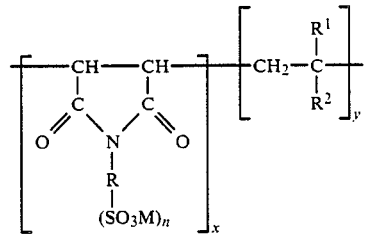

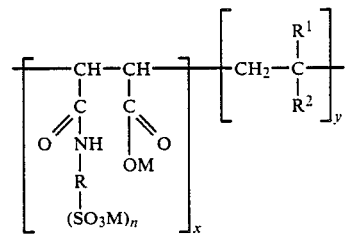

in which M, n, R, $R^1$, $R^2$, x and y have the meanings mentioned in the description, the use of the polymers obtained for surface-sizing of paper or paper-like materials and also novel polymers of the formulae I and/or II.

14 Claims, No Drawings

POLYMERS FROM ETHYLENIC MONOMERS

BACKGROUND OF THE INVENTION

1. Field of the Invention

The invention relates to polymers and their use, in particular, for surface-sizing of paper or paper-like materials.

2. Description of Related Art

A whole series of very effective anionic surface-sizing agents for paper which are employed not only as aqueous solutions but also in the form of aqueous emulsions have hitherto already been in use. Most of the hitherto known products have a strongly anionic character and are therefore limited to a certain degree in their range of application. To develop their full sizing effect, they require the presence of Al ions in the crude paper, that is, they can be used primarily for those types of paper which are prepared at acidic pH values. Examples of paper of these types are alum-containing or presized papers usually containing clay as a filler. However, it is a disadvantage that on alum-free and chalk-containing papers they exhibit only little or even in many cases no sizing at all. Since in recent years a trend towards production under neutral conditions, using chalk as filler, has been observed in paper production, it is important nowadays that a paper-sizing agent can be used for all customary types of paper and also shows a uni-formly good sizing effect for all those types. A surface sizing agent for paper which covers all possible production conditions under which paper is produced nowadays, would therefore be of very great interest not only for industry but also in terms of economics.

It would therefore be desirable to prepare a sizing agent which can be used not only in the acidic pH range in the case of alum-containing and presized papers but also in the neutral to weakly alkaline pH range in the case of alum-free and chalk-containing papers. In addition, the use of such a sizing agent should also give good results in the sizing of wood-containing papers.

SUMMARY OF THE INVENTION

One object of the present invention is accordingly to provide sizing agents for paper which have a broader application range than the hitherto used anionic products and which can be used not only in the acidic pH range in the case of alum-containing papers but also in the neutral to weakly alkaline pH range in the case of alum-free and chalk-containing papers and produce an excellent sizing effect.

Furthermore this invention provides novel polymers which have various advantageous possible applications.

In one aspect, the invention relates to polymers obtainable by subjecting at least one monomer, polymerizable by free radicals, to a free-radical emulsion polymerization in the presence of a polymer of the formulae I and/or II

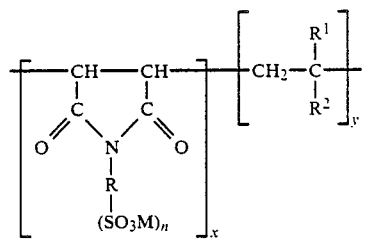

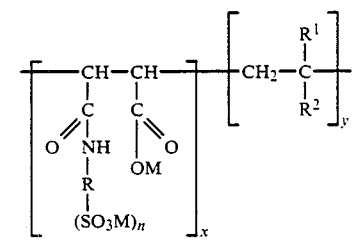

in which
M signifies a cation-forming radical, preferably H, Na, K, NH$_4$, R$^3$NH$_3$,
n signifies 1 or 2,
R signifies an aliphatic radical having 1 to 10 carbon atoms or an aromatic radical having 1 to 10 carbon atoms, preferably a radical derived from a C$_1$-C$_4$-alkane or from benzene, methylbenzene or naphthalene,
R$^1$ signifies H, —CH$_3$,
R$^2$ signifies H, C$_1$-C$_6$-alkyl, preferably—CH$_3$, —C$_2$H$_5$, —C$_4$H$_9$, —CH$_2$—C(CH$_3$)$_3$, and phenyl,
R$^3$ signifies a hydrocarbon radical of an amine and
x, y are selected in such a manner that the weight average of the molecular weight ($\overline{M}_w$) of the polymers I and II is 5,000 to 500,000, preferably 10,000 to 200,000, and the ratio of x:y is 1:4 to 1:1, preferably 1:3 to 1:1.
R particularly prefer for —CH$_2$—CH$_2$—.

DESCRIPTION OF THE PREFERRED EMBODIMENTS

The polymers of the formulae I and/or II can be mixtures in which preferably $\geq$80, particularly preferably $\geq$90, % by weight, relative to the mixture, of structural units I are present.

Suitable monomers polymerizable by free radicals are in particular styrene (derivatives), (meth)acrylates and/or (meth)acrylonitrile and also mixtures of these monomers. Suitable examples are: styrene, α-methylstyrene, acrylonitrile, vinyl acetate, ethyl acrylate, methyl methacrylate, n-butyl acrylate, i-butyl acrylate, 2-ethylhexyl acrylate and oxypropyl methacrylate. Particularly preferably, n-butyl acrylate, styrene and acrylonitrile are used. Very particularly preferably, a mixture containing 20 to 80, in particular 30 to 70, % by weight of n-butyl acrylate and 80 to 20, in particular 70 to 30, % by weight of acrylonitrile is used.

The free-radical emulsion polymerization of the monomers in the presence of polymers I and/or II which can act as emulsifiers and graft substrates is carried out in the usual manner. For example, the procedure can be as described below:

A copolymerization initiated by free radicals of (mixtures of) the monomers is carried out in the presence of aqueous solutions of the polymer emulsifiers I and/or II. Examples of suitable free-radical initiators are potassium persulphate, ammonium persulphate, organic peroxides, organic hydroperoxides, hydrogen peroxide and also redox systems. The emulsion polymerizations take place at temperatures between 20° and 100°, preferably 40° and 80° C. The amount of the polymer emulsifiers is between 5 and 30% by weight, preferably between 7.5 and 20% by weight, relative to the monomers to be polymerized.

The emulsion polymerizations can be carried out either by initially introducing an aqueous solution of the polymer emulsifier and then metering in the monomers and the initiator separately over a certain period, for example between 2 and 6 hours, or instead by initially introducing a portion of the polymer emulsifier in water and metering in the remainder together with the monomers and the initiator in separate volume streams likewise over a period of 2 to 6 hours. However, the procedure can also be such that over the entire period of the polymerization the polymer emulsifier, the initiator and the monomers are separately and continuously metered in and only a certain amount of water is initially introduced. However, this type of polymerization is also suitable for carrying out the process batchwise, that is, the polymer emulsifier, (the mixture of) the monomers and the initiator are together initially introduced, the mixture is heated to the desired polymerization temperature and maintained at this temperature for 2 to 10 hours.

After the polymerization reaction is completed in the manner described by way of example, a finely divided aqueous polymer emulsion having an average particle diameter between 40 and 400 nm has formed. In addition to homopolymers and/or copolymers of the monomers or mixtures of the monomers used for the polymerization, the emulsion also contains portions of graft products of the monomers which have been grafted onto the polymer emulsifiers as graft substrates.

If desired, the aqueous polymer emulsions can be worked up in a conventional manner to produce the solid polymers.

The polymers according to the invention can be used, for example, as film-forming materials or as sizing agents for fibres, in particular for glass fibres. However, they are preferably used in the form of aqueous emulsions (formed during their preparation) for surface-sizing of paper or paper-like materials such as cardboard or paperboard.

These polymers are surface-sizing agents having a weakly anionic character and a slight tendency for foam formation and a broad range of application. Thus they can be used in paper production not only in an acidic but also in a neutral pH range. In the case of alum-containing, alum-free, presized and wood-containing papers which can contain various fillers such as kaolin, chalk or $TiO_2$, they have an excellent sizing effect.

The surface-sizing agents can be used in all processing methods which are customary in paper production for surface-sizing, such as use in the sizing press or application by spraying processes. The sizing-agents can be used not only by themselves but also in combination with aqueous solutions of polymers. They are insensitive to foam-promoting influences, for example unfavourable apparative conditions in the paper-making machine or the sizing press, foam-forming additives in the sizing-agent liquor and high degrees of hardness of the water used in paper production. In addition to their good sizing effect, their low foam-forming tendency represents a further advantage, since they can be used without the addition of defoaming agents. The sizing agents are suitable either by themselves or in combination with sizing agents which are added to the material for surface-sizing of almost any paper grades produced in practice, for example of alum-containing and alum-free papers and those containing fillers consisting of kaolin, chalk or $TiO_2$ and those produced in a neutral or acidic pH range and unsized, presized, wood-containing papers and those containing wastepaper.

The novel sizing agents are distinguished in particular by having, compared to sizing agents which have a high degree of anionic character, a significantly broader range of application. While the latter have a good sizing effect only on alum-containing presized and wood-containing papers, the products according to the invention have excellent sizing properties not only on the papers mentioned but also on alum-free and chalk-containing papers. To obtain good sizing on the two last-mentioned papers, up to now it has always been necessary to use surface-sizing agents having a cationic charge.

Some of the polymers I and II are known (see, for example, German Offenlegungsschrift No. 3,344,470). They can be prepared by or analogously to known processes. For example, the following procedure can be followed: copolymers of maleic anhydride or maleic (half) esters and olefins of the formula

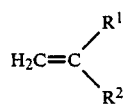

III in which $R^1$, $R^2$ have the meanings given for formulae I and II, are reacted with aminosulphonic acids or salts of the formula

IV in which R, M and n have the meanings given for formulae I and II, in organic solvents or preferably in an aqueous solution at temperatures up to 250° C., preferably 100° to 250° C., particularly preferably 120° to 200° C., and reaction times of 5 to 20 hours, preferably 10 to 15 hours.

Suitable copolymers are copolymers having an alternating or random structure of MA and, for example, ethylene, styrene, α-methylstyrene, propylene, isobutylene, 1-butene and diisobutylene, the molar ratio of maleic anhydride and the monomers to be copolymerized being between 1:1 and 1:4, preferably between 1:1 and 1:3. The preparation of these copolymers is known and has been described, for example, in Houben-Weyl, Methoden der organischen Chemie (Methods of Organic Chemistry), Vol. E XIV, part 2, Georg Thieme Verlag, Stuttgart, 1987.

Examples of aminosulphonic acids of the formula IV are: 2-aminoethanesulphonic acid, 2-aminobenzenesulphonic acid, 3-aminobenzenesulphonic acid, 4-aminobenzenesulphonic acid, aminonaphthalenesulphonic acids, 4-amino-1,3-benzenedisulphonic acid, 5-amino-1,3-benzenedisulphonic acid and 2-amino-1,4-benzenedisulphonic acid.

In a further aspect, the invention relates to polymers of the formulae

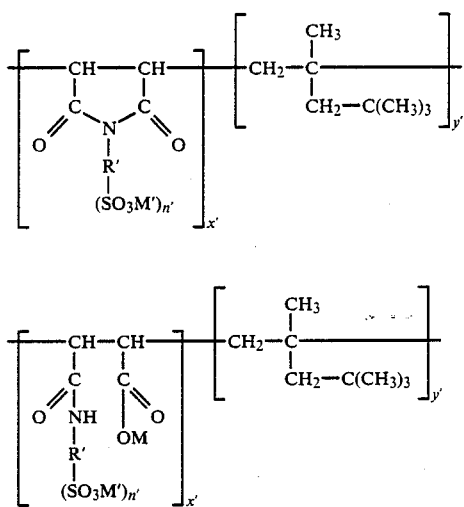

in which

M' signifies a cation-forming radical, preferably H, Na, K, NH$_4$, R$^4$NH$_3$, n' signifies 1 or 2, R' signifies an aliphatic radical having 1 to 10 carbon atoms, preferably a radical derived from a C$_1$–C$_4$-alkane, preferably —CH$_2$—CH$_2$—, R$^4$ signifies the hydrocarbon radical of an amine and x', y' are selected such that the weight average of the molecular weight ($\overline{M}_w$) of polymers V and VI is 5,000 to 500,000, preferably 10,000 to 200,000, the ratio of x':y' being 1:1.5 to 1.5:1, preferably 1:1.05 to 1.05:1.

The novel polymers prepared, for example, in the abovementioned manner can be used, for example, as emulsifiers for the preparation of aqueous dispersions and emulsions and also as additives for cement formulations (fluid loss additives in cement slurries for deephole drilling), for example by the procedure described in German Offenlegungsschrift No. 3,344,470. However, of particular importance is their use as polymer emulsifiers or graft substrates for the preparation of the polymers according to the invention from monomers polymerizable by free radicals.

The percentage data in the examples which follow always refer to weight.

EXAMPLES (1) Preparation of the polymer emulsifier I:

A 6 l stainless steel autoclave is charged with a mixture of 450 g of an alternating styrene/maleic anhydride copolymer of $\overline{M}_w$ of about 50,000, 776 g of a 42.2% strength by weight solution of sodium 2-aminoethanesulphonate in water and 2,661 g of electrolyte-free water. After purging 3 times with nitrogen, the autoclave is sealed and heated at 100° C. for 10 hours with stirring. The temperature is then raised to 180° C., the mixture is stirred for another 5 hours, the temperature is finally increased to 200° C. and the mixture is stirred at this temperature again for 5 hours. Cooling to room temperature gives a clear aqueous solution of the polymer emulsifier I having a solids content of about 20% by weight.

(2) Preparation of the polymer emulsifier II.

The preparation of the polymer emulsifier II is carried out as described in (1), using the following reaction mixture:

420 g of an alternating diisobutylene/maleic anhydride copolymer of $\overline{M}_w$ of about 11,000, 697 g of a 42.2% strength by weight solution of sodium 2-aminoethanesulphonate in water and 2,346 g of electrolyte-free water.

After the reaction is finished, an aqueous solution of the polymer emulsifier II having a solids content of 19.1% by weight is obtained.

(3) Preparation of the polymer emulsifier III

The preparation of the polymer emulsifier III is carried out as described in (1) and (2), using the following reaction mixture:

606 g of a copolymer having a random structure of styrene and maleic anhydride and a maleic anhydride content of 33.5% by weight and an $\overline{M}_w$ of about 46,000, 618 g of a 48.2% strength by weight solution of sodium 2-amino-ethanesulphonate in water and 3,294 g of electrolyte-free water.

After the reaction is complete, an aqueous solution of the polymer emulsifier III having a solids content of 18.8% by weight is obtained.

(4) Preparation of the polymer emulsifier IV

The preparation of the polymer emulsifier IV is carried out as described in (3), using the following reaction mixture:

690 g of a copolymer having a random structure of styrene and maleic anhydride and a maleic anhydride content of 29.2% by weight and an $\overline{M}_w$ of about 120,000, 618 g of a 48.2% strength by weight solution of sodium 2-aminoethanesulphonate in water and also 3,627 g of electrolyte-free water.

After the reaction is completed and the mixture has been cooled to room temperature, an aqueous solution of the polymer emulsifier IV having a solids content of 19.1% by weight is obtained.

(5) Preparation of the sizing agent emulsion A

A three-neck flask equipped with reflux condenser and two dropping funnels is charged while stirring and passing nitrogen over the solution with 102.6 g of a 19.5% strength by weight aqueous solution of the polymer emulsifier I in 528 g of electrolyte-free water, and the mixture is heated to 65° C. At this temperature, first a solution of 200 mg of potassium persulphate in 17.5 g of water and also a mixture of 13.75 g of n-butyl acrylate and 11.25 g of acrylonitrile are added, and the mixture is stirred for one hour. Solutions (1)+(2),

| Solution (1): | 600 mg of potassium persulphate 52.5 g of water |
|---|---|
| Solution (2): | 41.25 g of n-butyl acrylate 33.75 g of acrylonitrile | are then added dropwise simultaneously and separately over a period of 3 hours at 65° C.

After the addition is completed, stirring is continued for another 2 hours at 70° and another 3 hours at 80° C. Cooling to room temperature gives a finely divided copolymer emulsion having a solids content of 14.8% by weight, which is used directly as such for surface-sizing of paper.

(6) Preparation of the sizing agent emulsion B

A three-neck flask is charged while stirring and passing nitrogen over the solution with 6.6 g of the 19.1% strength by weight aqueous solution of the polymer emulsifier II and 374 g of electrolyte-free water, and the mixture is heated to 65° C. At this temperature, first a solution of 200 mg of potassium persulphate in 17.5 g of water and also a mixture of 13.75 g of n-butyl acrylate and 11.25 g of acrylonitrile is added, and the mixture is stirred for one hour. Solutions (91)+(2)30 (3) are then added dropwise simultaneously but separately from three dropping funnels over a period of 3 hours.

| Solution (1): | 600 mg of potassium persulphate |
| | 52.5 g of water |
| Solution (2): | 41.25 g of n-butyl acrylate |
| | 33.75 g of acrylonitrile |
| Solution (3): | 19.7 g of the solution of the polymer emulsifier II (solids content: 19.1%) |
| | 130 g of water |

After the addition is completed, stirring is continued for another 2 hours at 70° C. and another 3 hours at 80° C. Cooling to room temperature gives a finely divided sizing agent emulsion having a solids content of 15.5% by weight.

(7) Preparation of the sizing agent emulsion C

A three-neck flask is charged with a mixture of 50 g of a 20% strength by weight aqueous solution of the polymer emulsifier III and 513 g of electrolyte-free water, and the mixture is heated to 65° C. with stirring and while passing a slight nitrogen stream over the solution. At this temperature, first a solution of 200 mg of potassium persulphate in 17.5 g of water and also a mixture of 12.50 g of n-butyl acrylate and 12.50 g of acrylonitrile is added, and the mixture is stirred for 1 hour. Solutions (1) and (2) are then added dropwise simultaneously over a period of 3 hours at 65° C. from two separate dropping funnels:

| Solution (1): | 600 mg of potassium persulphate |
| | 52.5 g of water |
| Solution (2): | 37.5 g of n-butyl acrylate |
| | 37.5 g of acrylonitrile |

After the addition of solutions (1) and (2) is completed, stirring is continued for another 2 hours at 70° and another 3 hours at 80° C. Cooling to room temperature gives the sizing agent emulsion C having a solids content of 14.8% by weight.

(8) Preparation of the sizing agent emulsion D

The preparation of the sizing agent emulsion D is carried out in the same manner as that of emulsion C, except that 75 g of the 19.1% strength aqueous solution of the polymer emulsifier IV and also 521 g of electrolyte-free water are used as initial mixture. After the polymerization is completed, the finely divided sizing agent emulsion D having a solids content of about 14.3% is obtained.

WORKING EXAMPLES

The sizing effect of the sizing agents according to the invention was tested using five different types of paper which had the following composition:

(a) Alum-free paper 50% of softwood cellulose, 50% of hardwood cellulose, 9.5% of clay ash, pH in the headbox: 7.2; degree of fineness: 35SR; wet pick-up in a laboratory sizing press: about 85%; paper weight: 80 g/m$^2$.

(b) Alum-containing paper:

50% of softwood cellulose, 50% of hardwood cellulose, 1% of alum, 11.2% of clay ash, pH in the headbox: 5.0; degree of fineness: 35° SR; wet pick-up: about 80%; paper weight: 80 g/m$^2$.

(c) Pre-sized paper:

50% of softwood cellulose, 50% of hardwood cellulose, 1% of aluminium sulphate, 11.1% of clay ash, 0.1% of resin size, pH in the headbox: 4.5; wet pick-up: about 70%; paper weight: 80 g/m$^2$.

(d) Chalk-containing paper:

50% of bleached birch sulphate, 50% of bleached pine sulphate, 15% of chalk, degree of fineness: 35° SR, wet pick-up: 80%; pH in the headbox: 7.5; paper weight: 75 g/m$^2$.

(e) Wood-containing paper

40% of softwood cellulose, 60% of ground wood, 1% of alum, 14.1% of clay ash, pH in the headbox: 4.5; wet pick-up: about 50%; paper weight: 75 g/m$^2$.

The sizing of the papers was carried out on a laboratory sizing press from Mathis, Zürich, Switzerland, type HF. The sizing liquor used was a solution of 5 parts by weight of commercially available starch and also 0.15, 0.20, 0.26, 0.32 and 0.40 parts of the sizing agent to be tested, which was made up to 100 parts with water. The drying of the surface-sized papers was carried out on a drying cylinder over a period of one minute at about 100° C. Before the sizing test, the papers were conditioned at room temperature for 2 hours.

To evaluate the degree of sizing of the surface-sized papers, the Cobb values (according to DIN 53,132) were determined and also ink flotation tests (IFT) were carried out. For the ink flotation tests, the papers were cut into strips, 3 cm wide and 3 cm long, and placed at 22° C. on blue test ink (DIN 53,126). After the tests whose times were different for the individual types of paper, the test papers were removed from the ink, squeezed off with their near side on blotting paper and evaluated visually after 5 minutes. To determine the ink penetration through the paper and thus the degree of sizing qualitatively, an evaluation using the numbers 1 to 5 was carried out, the individual numbers denoting:

| | |
|---|---|
| 1 | no ink penetration |
| 2 | 5 to 10% of ink penetration |
| 3 | 10 to 20% of ink penetration |
| 4 | about 50% of ink penetration |
| 4,5* | about 90% of ink penetration |
| 5 | 100% of ink penetration |

*In addition, further intermediate values can additionally be used.

The tables which follow show the effectiveness of the paper surface-sizing agents A–F according to the invention on various types of paper.

Working Example 1

5 different types of paper were surface-sized using the sizing agent emulsion A ("SA A"). Table 1 shows the Cobb values measured and Table 2 the results of the ink flotation tests found:

TABLE 1

| Type of paper | Cobb value (60") in g/m² upon addition of "SA A" | | | |
|---|---|---|---|---|
| | 0.20% | 0.26% | 0.32% | 0.40% |
| Alum-free | 23.7 | 22.4 | 22.2 | 21.3 |
| Chalk-containing | 24.9 | 23.1 | 23.0 | 20.4 |
| Alum-containing | 21.6 | 20.8 | 20.8 | 19.5 |
| Presized | 19.8 | 19.7 | 19.7 | 19.3 |
| Wood-containing | 19.3 | 19.0 | 19.0 | 18.4 |

TABLE 2

| Type of paper | Time | IFT upon addition of "SA A" | | | |
|---|---|---|---|---|---|
| | | 0.20% | 0.26% | 0.32% | 0.40% |
| Alum-free | 20' | 2.5 | 2.5 | 2 | 1.5 |
| Chalk-containing | 20' | 2 | 2 | 1.5 | 1.5 |
| Alum-containing | 20' | 2.5 | 2.5 | 2 | 2 |
| Presized | 3' | 3.5 | 3 | 3 | 3 |
| Wood-containing | 5' | 3.5 | 3.5 | 3 | 3 |

Working Example 2

In this example, likewise 5 different types of paper were surface-sized using the sizing agent B ("B"). Table 3 shows the Cobb values measured and Table 4 the evaluations of the ink flotation tests:

TABLE 3

| Type of paper | Cobb value (60") in g/m² upon addition of "SA B" | | | |
|---|---|---|---|---|
| | 0.20% | 0.26% | 0.32% | 0.40% |
| Alum-free | 23.8 | 23.6 | 23.1 | 21.8 |
| Chalk-containing | 23.9 | 23.4 | 22.4 | 22.0 |
| Alum-containing | 22.1 | 21.6 | 20.9 | 19.8 |
| Presized | 19.5 | 19.3 | 18.5 | 18.4 |
| Wood-containing | 19.1 | 18.8 | 18.8 | 18.6 |

TABLE 4

| Type of paper | Time | IFT upon addition of "SA B" | | | |
|---|---|---|---|---|---|
| | | 0.20% | 0.26% | 0.32% | 0.40% |
| Alum-free | 15' | 2 | 2 | 1.5 | 1.5 |
| Chalk-containing | 20' | 2 | 1.5 | 1 | 1 |
| Alum-containing | 15' | 2.5 | 2 | 2 | 2 |
| Presized | 3' | 3 | 3 | 2.5 | 2.5 |
| Wood-containing | 3' | 3.5 | 3.5 | 3 | 3 |

Working Example 3

In this example, alum-free and chalk-containing paper were surface-sized using 0.15% of sizing agent C. In Table 5, the results found in practical application are listed.

TABLE 5

| Type of paper | Cobb value (60") [g/m²] | Time | IFT Evaluation |
|---|---|---|---|
| Alum-free | 26.9 | 7' | 2.5 |
| Alum-containing | 21.5 | 12' | 2 |

Working Example 4

In Table 6, the results which were likewise obtained on alum-free and chalk-containing paper using the sizing agent emulsion D (using: 0.15% of active sizing agent) are listed:

TABLE 6

| Type of paper | Cobb value (60") [g/m²] | Time | IFT Evaluation |
|---|---|---|---|
| Alum-free | 25.8 | 15' | 2 |
| Alum-containing | 22.4 | 12' | 2 |

All four working examples clearly show that sizing agents according to the invention have excellent sizing properties on papers of different composition.

In addition, the products according to the invention have only a low tendency to foaming, as measurements of their foaming behaviour show.

Working Example 5

Using the example sizing agents B and C, the measurement of the foaming behaviour is described.

0.4% by weight of active substance are dissolved in a sizing liquor of 5% by weight of commercially available starch (Perfectamyl A 4692®), and the mixture is heated to 60° C. 200 ml of this sizing liquor are passed from an aluminium vessel containing a circular opening, 4 mm in diameter, (Ford cup) at its bottom from a height of 60 cm into a graduated beaker by free fall. The volume in ml of the foam forming above the surface of the liquid is determined once immediately and then after standing in air for 1 minute. The first value gives information about the tendency of the sizing agent to foam and the second value about the rate of defoaming or about its stability. The test results obtained using the surface-sizing agents are summarized in Table 7:

TABLE 7

| Sizing agents | Foam volume in 1 ml | |
|---|---|---|
| | immediately | after 1 minute |
| B | 90 | 40 |
| C | 80 | 40 |

The results found clearly show that the products tested have only a very slight tendency to foam given the foam volumes measured of <100 ml.

We claim:

1. A polymer obtainable by subjecting at least one monomer selected from the group consisting of styrene, alpha-methylstyrene, acrylonitrile, vinyl acetate, ethyl acrylate, methyl methacrylate, n-butyl acrylate, i-butyl acrylate, 2-ethylhexylacrylate and oxypropyl methacrylate to a free-radical emulsion polymerization in the presence of a polymer of the formulae I and/or II

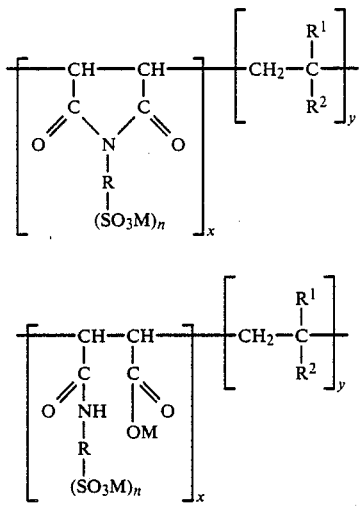

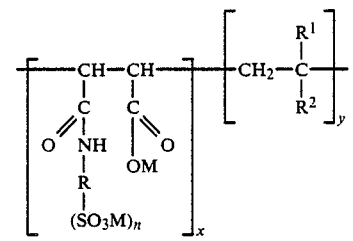

in which
M signifies a cation-forming radical,
n signifies 1 or 2,
R signifies an aliphatic radical having 1 to 10 carbon atoms or an aromatic radical having 1 to 10 carbon atoms,
$R^1$ signifies H or —$CH_3$,
$R^2$ signifies H, $C_1$-$C_6$-alkyl, and phenyl,
$R^3$ signifies a hydrocarbon radical of an amine and
x and y are selected in such a manner that the weight average of the molecular weight ($\overline{M}_w$) of the polymers I and II is 5,000 to 500,000 and the ratio of x:y is 1:4 to 1:1.

2. A polymer according to claim 1, obtainable by using a polymer of the formulae I and/or II in which R stands for —$CH_2$—$CH_2$—.

3. A polymer according to claim 1, obtainable by using a mixture of polymers I and II in which 80% by weight, relative to the mixture, of structural units of polymer I are present.

4. A polymer according to claim 1 obtainable by using a mixture of monomers of 20 to 80% by weight of n-butyl acrylate and 80 to 20% by weight of acrylonitrile.

5. A polymer according to claim 1, wherein 5 to 30% by weight relative to the monomers to be polymerized, of a polymer emulsifier are used.

6. A polymer according to claim 1 obtainable by initiating the polymerization of the monomers by free-radical initiators at temperatures of 20° to 100° C.

7. A polymer according to claim 1, wherein R is a radical derived from a $C_1$-$C_4$-alkane or from benzene, methylbenzene or naphthalene.

8. A polymer according to claim 1, wherein $R^2$ is —$CH_3$, $C_2H_5$, —$C_4H_9$ or —$CH_2$—$C(CH_3)_3$.

9. A polymer according to claim 1, wherein x and y are selected in such a manner that the weight average of the molecular weight of polymers I and II is 10,000 to 200,000.

10. A polymer according to claim 1, wherein the ratio of x:y is 1:3 to 1:1.

11. A polymer according to claim 1, obtainable by using of mixture of polymers I and II in which $\geq$90% by weight, relative to the mixture, of structural units of polymer I are present.

12. A polymer according to claim 1, obtainable by using a mixture of monomers of 30 to 70% by weight of n-butyl acrylate and 70 to 30% by weight of acrylonitrile.

13. A polymer according to claim 1, wherein 7.5 to 30% by weight, relative to the monomers to be polymerized, of a polymer emulsifier is used.

14. A polymer according to claim 1, where in M is H, Na, K, $NH_4$ or $R^3NH_3$ and $R^3$ is a hydrocarbon radical of an amine.

* * * * *

UNITED STATES PATENT AND TRADEMARK OFFICE
CERTIFICATE OF CORRECTION

PATENT NO. : 4,931,510

DATED : June 5, 1990

INVENTOR(S) : Sackmann et al.

It is certified that error appears in the above-identified patent and that said Letters Patent is hereby corrected as shown below:

Col. 11 claim 1 Delete " $R^3$ signifies a hydrocarbon radical of an amine " line 31

Signed and Sealed this

Twenty-first Day of January, 1992

Attest:

HARRY F. MANBECK, JR.

Attesting Officer

Commissioner of Patents and Trademarks